United States Patent [19]

Murphy

[11] Patent Number: 4,762,258
[45] Date of Patent: Aug. 9, 1988

[54] UNIVERSAL SUPPORT DEVICE FOR A VEHICLE

[76] Inventor: I. Leon Murphy, P.O. Box 215, Daleville, Ind. 47334

[21] Appl. No.: 4,812

[22] Filed: Jan. 9, 1987

Related U.S. Application Data

[63] Continuation of Ser. No. 658,038, Oct. 5, 1984, abandoned.

[51] Int. Cl.$^4$ ............................................. B60R 7/00
[52] U.S. Cl. ..................................... 224/273; 108/44
[58] Field of Search ............ 224/901, 273, 311, 42.43, 224/42.42, 42.44, 277; 296/37.8, 37.2; 108/44, 45, 46; 16/300, 298, 319, 337, 338, 339

[56] References Cited

U.S. PATENT DOCUMENTS

| | | | |
|---|---|---|---|
| 1,485,102 | 2/1924 | Wells | 224/42.43 X |
| 1,610,404 | 12/1926 | Winfrey | 16/339 |
| 1,898,511 | 2/1933 | Turnquist | 16/338 |
| 1,995,656 | 3/1935 | Stout | 224/42.43 X |
| 2,862,328 | 12/1958 | Wadsworth | 108/45 X |
| 2,930,074 | 3/1960 | Marks | 16/338 X |
| 3,280,765 | 10/1966 | Storms | 108/45 |
| 3,383,738 | 5/1968 | Fox et al. | |
| 3,430,299 | 3/1969 | Copen . | |
| 3,466,774 | 9/1969 | Borresen . | |
| 3,642,122 | 2/1972 | Von Ende | 224/901 X |
| 3,712,235 | 1/1973 | Russ | 224/273 X |
| 3,751,100 | 8/1973 | Keyes . | |
| 3,785,300 | 1/1974 | Anderson | 108/44 |
| 3,825,973 | 7/1974 | Gwozdz | 16/300 |
| 4,071,174 | 1/1978 | Weiner | 224/277 |
| 4,241,870 | 12/1980 | Marcus | 296/37.8 X |
| 4,303,109 | 12/1981 | Cohen | 224/273 X |
| 4,391,457 | 7/1983 | Gassner . | |
| 4,429,348 | 1/1984 | Dean . | |

Primary Examiner—Henry J. Recla
Attorney, Agent, or Firm—Jeffers, Hoffman & Niewyk

[57] ABSTRACT

A support device for supporting small articles. The device is adapted to be secured to a supporting panel such as the windshield of an automobile. The device is formed of two planar members, one of which is adapted to be secured to a support panel member. The two planar members are interconnected by means of a hinge whereby the second planar member may be rotated about a hinge pin to lie at any desired angle with respect to the first planar member. Thus the first planar member may be secured to a windshield or a similar supporting surface which is disposed at an angle with respect to the vertical, whereby the second member may be rotated to be at a desired orientation, for instance horizontal. The hinge includes a fastner to tightly press the hinge knuckles together to maintain the orientation of the two planar members with respect to each other.

3 Claims, 1 Drawing Sheet

UNIVERSAL SUPPORT DEVICE FOR A VEHICLE

This is a continuation of application Ser. No. 658,038, filed 10/5/84, now abandoned.

The present invention relates to accessory devices for vehicles, and more particularly to a device for providing convenient and handy support and storage for articles desirably kept easily accessible to the vehicle driver.

Even more particularly, the invention advantageously provides a convenient storage for an article which may not be often used, yet when the article is needed it is needed urgently.

Such an article, needed only occasionally by a driver yet when needed is needed promptly, and while the vehicle is still moving, and yet without a bothersome search of the vehicle, and an article whose storage is usually quite haphazard because its nature and use inherently usually prevents the driver from storing it until after the vehicle has been started, is the device used for actuating movement of the door of the garage of the vehicle; and thus the device of the present invention is particularly advantageous as for providing storage for a "garage door opener" device, although storage of other articles, such as a cigarette package, small notepad, etc., may provide also a handy use for the storage device of the present invention.

Garage door opener devices have been used now for many years, and the use of an automatic garage door is not only very convenient for the vehicle driver, but it has other advantages; i.e., it provides safety from intruders, it permits door-actuation by persons with bad backs or other handicaps, etc.

However, since upon the vehicle exiting from the garage the garage door is usually closed by the driver (or someone else in the vehicle), rather than being left open, and rather than being closed by a person remaining at the home, the door opener device is used by the driver (or passenger) after the car is in motion, thus meaning that it cannot usually be conveniently put in one of the storage facilities accessible to the front seat occupants; for those often have a lock whose most convenient key thereto is on the key assembly already in the vehicle's ignition lock. And even if such storage is open, or unlocked, often the vehicle will have an accumulation of other items such as music tapes, tape boxes, highway maps, etc., which make it difficult to find the garage door opener, or other article for special use of the storage provided by the present invention.

Thus an article such as a garage door opener is often just placed on the front seat; but, even though at the time it seems that surely it will be readily found upon returning, for any number of reasons it will indeed not be often easily found after the many hours and miles which the vehicle will travel before coming back to the garage.

For storage of a garage door opener or other article, for ready and prompt accessibility to the vehicle's front seat occupants, the present invention provides a "universally fitting" storage device, mountable on a panel which desirably is the inside surface of the vehicle windshield, and within easy accessibility of the driver or the front seat passenger; and the device is made to be "universally fitting" by having a pair of interconnected body members, one being attachable to the panel of windshield, and the other providing a support shelf.

Moreover, the interconnection of the two body members is rotatable, thus providing that the shelf member may be set to be generally horizontal even though windshield panels of different vehicles have considerable variation in the slope of their windshields; and holding means are providing, desirable as part of a hinge mechanism, by which that desired generally horizontal orientation of the support shelf is maintained, all in spite of there being no need to measure the windshield slope, or do other similar preliminary steps, prior to attaching the device to the windshield panel.

Of course if the device is attached to the windshield as the support panel, it is to be attached at a location, such as adjacent the rear mirror support, which will impose no significant obstruction to vision.

The above description is somewhat introductory and generalized form. More particular details, concepts, and features are set forth in the following and more detailed description of an illustrative embodiment, taken in conjunction with the accompanying drawings, which are of somewhat schematic and diagrammatic nature, and in which.

Figure 1:
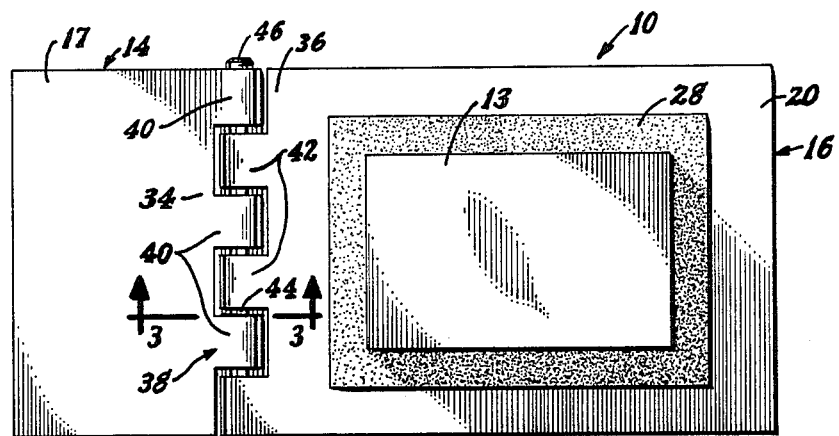
FIG. 1 is a top or plan view of the support device of the present invention, with a garage door opener being shown in the position it would be when supported thereon, but in a form or position of the device prior to assembly onto a vehicle panel, and thus prior to the time in which the door opener would be supported by the device.
Figure 2:
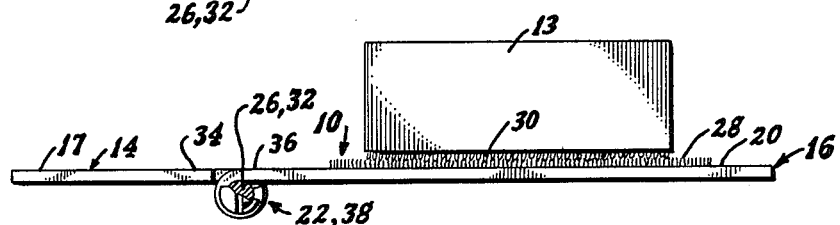
FIG. 2 is a side elevational view thereof.
Figure 3:
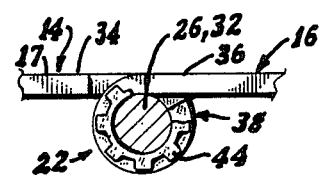
FIG. 3 is an enlarged scale fragmental vertical cross-sectional view, generally as taken by Section-line 3—3 of FIG. 1.
Figure 4:
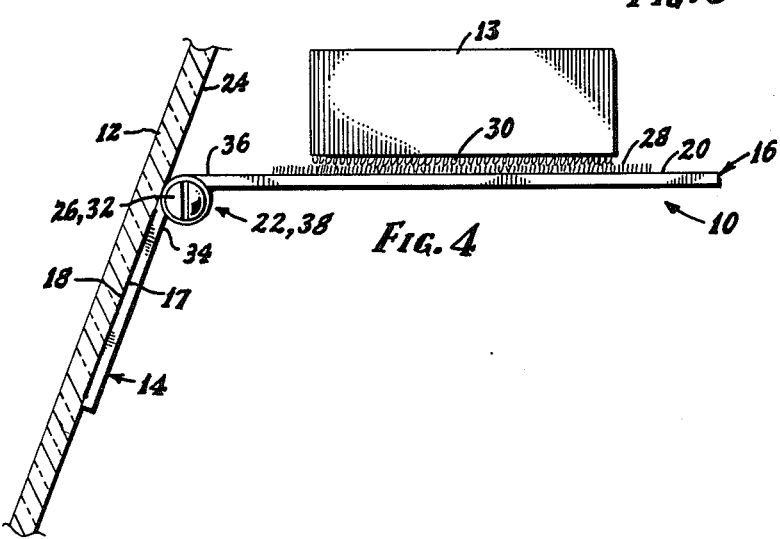
FIG. 4 is a side elevational view of the device, now as assembled onto a vehicle windshield, and with the garage door opener device supported by the device.

As shown in the drawings, the present invention provides a universal support device 10 for an associated vehicle, and more particularly for the vehicle's windshield 12 as being the vehicle's panel member which is sturdy enough to support the weight of the device and an associated "garage door opener" device 13 which is supported by the support device 10, and also within easy reach of the driver or other front seat passenger. While many panel surfaces in a vehicle could be used to support the device according to the instant invention, the windshield is illustrated as the support surface in the disclosed embodiment.

The device 10 as shown includes, as perhaps its most apparent feature, a pair of body members, herein referred to a first body member 14 and a second body member 16, they being movably but fixedly interconnected as specified herein.

The first body member 14 is shown as having an operatively planar surface 17 for accommodating the securing of the first body member 14 to the vehicle windshield 12, and the drawings illustrate it as mounted thereon and secured thereto by glue 18.

Differing in purpose from the first body member 14, the second body member 16 provides a supporting surface 20 of a nature, with respect to its strength and size, capable of supporting the associated door-opener or other article 13.

A significant characteristic of the inventive concepts of the support device 10 is that there is provided interconnection means 22 which relatively rotatably interconnect the first body member 14 and the second body 16; and of further significance is the factor that the interconnection means 22 accommodates a relative rotation of the first and second body members 14–16 within a range of angles, that is, a range of angles between the supporting surface 20 of the second body member 16 and the operatively planar surface 17 of the first body member 14, so as to accommodate the operatively planar surface 17 of the first body member 14 to lie against and be mounted onto the accessible surface 24 of the windshield 12 (that windshield surface 24 of course being the inner surface 24 of the vehicle's windshield 12), but with, nevertheless, the supporting surface 20 of the second body member 16 disposed in a generally horizontal orientation, regardless of variations in the orientation of the particular vehicle's windshield 12 or whatever is the panel member from which the device 10 is supported. In the illustrated embodiment, the orientation of body member 16 is chosen as horizontal.

Of further and very significant importance to the device 10 is holding means 26 which hold any selected rotational relationship of the two body members 14–16 in the relative position as designated above, i.e., with the upper or supporting surface 20 of the second body member 16 generally horizontal regardless of what is the angle between that surface 20 the operatively planar surface 17 of the first body member 14 when that member 14 is secured against the windshield panel 12 of the associated vehicle. The orientation of surface 20 may be chosen to be in any desired plane.

Thus, regardless of the orientation of the supporting panel member 14 of the vehicle, the device 10 of this invention will fit a wide range of vehicle makes, models, and types, all without trimming, shimming, or other alteration, and without need of any substantial mechanical or installation skill, this being true and thus providing a universal adaptability of the device 10, even though the angle of relative rotation of the two body members 14–16 need not be predetermined prior to securing of the first body member 14 to the windshield or other panel 12.

More particularly in the embodiment shown, the article-supporting surface 20 of member 16 is provided with a Velcro or similar surface 28 for retention of the associated article 13 to be supported by the device 10. A matching surface 30 is desirably affixed to the article 13 for co-operation with the surface 28 on the support surface 20 of member 16.

Desirably and as shown, it is the interconnection means 22 which provides the holding means 26; and as shown the interconnection means 22 provides the holding means by a bolt means 32, the adjacent edges 34 and 36, respectively, of the first and second body members 14–16 being provided with hinge means 38. Thus a tightening of the bolt means 32 imposes a compressive stress onto the hinge leaves 40 and 42, respectively which co-operate to provide the hinge 38 components extending respectively from the first and second body members 14–16, it being noted that there are the same number of hinge-leaves 40 as hinge-leaves 42. Thus bolt 26 presses the mating adjacent surfaces of the hinge-leaves or knuckles 40, 42 tightly against each other when bolt 26 is tightened. Since the number of knuckles 40 is equal to the number of knuckles 42, bolt 26 compresses together all of the mating surfaces of knuckles 40, 42. Further, by providing a plurality of hinge knuckles and therefore a plurality of mating friction surfaces, a corresponding increase in friction of the hinge knuckles is achieved, thus improving the carrying ability of the device.

Further assurance of a tight holding of the set angle between the members 14 and 16, the holding means is provided to include resiliently deformable means which are provided for the hinge means 38, thus providing that tightening of the bolt means 32 imposes a resilient deformation of the resiliently deformable means, which deformation is operative to securely retain the selected rotational relationship of the two body members 14–16; and this resiliently deformable feature is shown in the illustrated embodiment by the provision of one or more lock washers 44 which are strung onto the bolt 32 between one or more of the adjacent edges of hinge-leaves 40 and 42.

The bolt 32, which serves as a hinge pin and a part of the holding means 26, is tightened by threads 46 on its end which engage threads (not shown) on the adjacent hinge leaf 40, or a nut may be provided.

It is thus seen that a universal support device for a vehicle, according to the inventive concepts, provides a desired and advantageous device, yielding the effectiveness and convenience of support of an associated object such as a garage door opener, handily accessible to the driver or front seat passenger of a vehicle, and providing a desired horizontal orientation of the device's support surface regardless of the slope of the particular vehicle's windshield or other panel of the mounting.

Accordingly, it will thus be seen from the foregoing description of the invention according to this illustrative embodiment, considered with the accompanying drawings, that the present invention provides new and useful concepts of a universal support device for a vehicle, yielding desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown. For example, the word "planar" with respect to the panel-attachment surface 17 does not necessarily mean an area of a geometric plane, but only the necessary "three points which define a plane", as is known as a principle of geometry.

What is claimed is:

1. A support device for supporting small articles in a vehicle or the like, said device comprising:
   first and second generally planar members, said first member adapted to be secured to a surface and said second member adapted to support an article, said first and second planar members each having a lateral side;
   hinge means for adjustably interconnecting said first and second planar members whereby said planar members may be oriented at an angle relative to each other, said hinge means including a first plurality of apertured knuckles secured to the lateral side of said first planar member, a second plurality of apertured knuckles secured to the lateral side of said second planar member, said first and second plurality of knuckles being equal in number, said first and second plurality of knuckles being arranged alternatingly serially to form an elongated hinge and thereby provide smooth contacting surfaces therebetween, a hinge pin disposed through said knuckle apertures, whereby each said knuckle encloses said hinge pin, and means for compressing said knuckles into tight engagement whereby said first and second planar members may be held in any desired relative angular relationship.

2. The device as set forth in claim 1 wherein said compressing means comprises threads on said hinge pin and a threaded nut.

3. The device as set forth in claim 1 wherein said hinge means includes a resiliently deformable means whereby said means for compressing provides resilient deformation of the resiliently deformable means to securely retain the selected angular relationship of the two planar members.

* * * * *